US005727619A

United States Patent [19]
Yao et al.

[11] Patent Number: 5,727,619
[45] Date of Patent: Mar. 17, 1998

[54] HONEYCOMB SANDWICH PANEL WITH BUILT IN HEAT PIPES

[75] Inventors: Akira Yao; Hiromi Seko, both of Kamakura, Japan

[73] Assignee: Mitsubishi Denki Kabushiki Kaisha, Tokyo, Japan

[21] Appl. No.: 677,950

[22] Filed: Jul. 10, 1996

Related U.S. Application Data

[62] Division of Ser. No. 462,474, Jun. 5, 1995.

[30] Foreign Application Priority Data

Aug. 10, 1994 [JP] Japan .................... 6-188441

[51] Int. Cl.⁶ .................................... F28D 15/00
[52] U.S. Cl. .............. 165/104.33; 361/700; 257/715; 165/185; 165/104.21
[58] Field of Search .............. 165/104.33, 104.21, 165/185; 257/715, 714; 361/710, 709, 707, 704, 701, 700

[56] References Cited

U.S. PATENT DOCUMENTS

| 4,145,708 | 3/1979 | Ferro et al. ........................ 257/715 |
| 5,146,981 | 9/1992 | Samarov ........................ 361/704 X |
| 5,216,580 | 6/1993 | Davidson et al. ........................ 361/700 |

FOREIGN PATENT DOCUMENTS

| 2109800 | 4/1990 | Japan . |
| 5136585 | 6/1993 | Japan ........................ 361/704 |
| 6170991 | 6/1994 | Japan . |

OTHER PUBLICATIONS

IBM Technical Disclosure Bulletin, vol. 34, No. 7B, Dec. 1991, pp. 321–322.

*Primary Examiner*—John Rivell
*Assistant Examiner*—Christopher Atkinson
*Attorney, Agent, or Firm*—Wolf, Greenfield & Sacks P.C.

[57] ABSTRACT

A sandwiched honeycomb panel with built in heat pipes includes a radiating fin which is integral with an envelope having a heat pipe formed therein. A heat block may be used in place of the radiating fin.

5 Claims, 6 Drawing Sheets

HONEYCOMB SANDWICH PANEL WITH BUILT IN HEAT PIPES

This application is a division of application Ser. No. 08/462,474, filed Jun. 5, 1995 entitled HONEYCOMB SANDWICH PANEL WITH BUILT-IN HEAT PIPES and pending.

BACKGROUND OF THE INVENTION

1. Field of the Invention

This invention relates to a honeycomb sandwich panel with built in heat pipes, and more particularly to a honeycomb sandwich panel with built in heat pipes which is used for installing various devices in a space shuttle or an artificial satellite, or for radiating heat from devices installed in the space shuttle or the artificial satellite.

2. Description of the Prior Art

FIG. 7A of the accompanying drawings is a perspective view of a conventional honeycomb sandwich panel with built in heat pipes (called "honeycomb sandwich panel" or "panel" hereinafter) used in an artificial satellite. FIG. 7B is a cross section of the honeycomb sandwich panel, taken along line 7B—7B in FIG. 7A.

In FIGS. 7A and 7B, reference numeral 1F denotes an inner surface of the panel, 1S denotes an outer surface of the panel, 2 denotes a honeycomb core, and 3 denotes envelopes having heat pipes therein. The honeycomb core 2 is sandwiched between the inner and outer surfaces 1S and 1F of the panel, thereby constituting the sandwich honeycomb panel. Each of the heat pipes is a cavity formed in an envelope 3 which is embedded in the panel, and can effectively transmit a large amount of heat. The envelope 3 will be called "heat pipe" hereinafter. Reference numeral 4 denotes a device such as an IC or LSI, which is installed on the panel so as to constitute and control an artificial satellite, and emits heat during its operation. The device 4 is installed on the inner surface 1F of the panel. Since performance and characteristics of the device 4 vary with heat, the device 4 should be progressively cooled so that it can operate at a predetermined constant temperature. Reference numeral 5 denotes a second surface mirror on the outer surface 1S of the panel facing toward outer space. The second surface mirror 5 radiates heat emitted by the device 4 into outer space. The heat pipes 3 extend throughout the panel, and are thermally coupled. In other words, the heat pipes constitute a heat transmitting network in the panel. When such panels are applied to a space shuttle or an artificial satellite present in outer space, a plurality of independent heat pipes 3 extend under the devices 4, thereby forming a redundant structure. Therefore, even if one of such heat pipes 3 becomes defective, heat can be reliably transmitted through the remaining heat pipes 3 and radiated into outer space.

As shown in FIG. 7B, a pair of envelopes forming the heat pipes 3 are bonded by an adhesive 6 such that they pass under the device 4.

Heat emitted from the device 4 will be radiated via the honeycomb sandwich panel into outer space as described hereinafter. Specifically, heat from the device 4 passes through the inner surface 1F due to heat conduction, reaching the heat pipes 3. Then, heat is transmitted via the heat pipes 3 throughout the panel. Finally, heat is radiated into outer space via the second surface mirror 5.

However, the foregoing conventional honeycomb sandwich panel with built in heat pipes is prone to the following problems. Heat is transmitted from the device 4 to the second surface mirror 5 via a very narrow area between the device 4 and the heat pipes 3. Since a thermal resistance is very large in this narrow area, there is a large temperature difference between the device 4 and the heat pipes 3. Therefore, the more heat the device 4 emits, the larger the temperature difference between the heat emitting device 4 and the heat pipes 3, which would keep the device 4 hotter.

SUMMARY OF THE INVENTION

The invention is intended to provide a heat pipe built in honeycomb sandwich panel which can overcome the problems of the prior art, and prevent a device from becoming too hot while maintaining rigidity of the panel.

First of all, in a heat-pipe-built-in honeycomb sandwich panel, a fin extends from an envelope having a heat pipe therein, and is partially in direct contact with one of outer surfaces and partially exposed.

The fin can mechanically reinforce the honeycomb sandwich panel. The direct contact of the fin with a device which emits heat can reduce a thermal resistance between the fin the device, thereby reducing heat generated in the device.

Secondly, the fin is joined with the outer surface of the panel on a wear plate, and the fin and the outer surface are flush with each other, which enables a device larger than the fin to be installed on the panel.

Thirdly, the honeycomb sandwich panel can have a heat block formed in the envelope with the heat pipe. The heat block is partially exposed from one of the outer surfaces.

The heat block can mechanically reinforce the honeycomb sandwich panel. Especially, the heat block can reduce a thermal resistance between the device emitting heat and a second surface mirror on an outer surface of the panel.

Fourthly, the honeycomb sandwich panel includes a heat transmitting plate which is directly bonded, on its lower surface, to the envelope having the heat pipe therein and which is partially exposed at its upper surface, and is made from a material assuring good heat conducting performance.

The heat transmitting plate can reinforce the sandwich honeycomb panel, and is in direct contact with a device, thereby effectively reducing heat generated in the device. Since the heat transmitting plate is independent from the heat pipe and can adjust its thickness, the sandwich honeycomb panel is compatible with any existing heat pipes. This enables the panel to be applicable to any conventional heat pipes. Since the heat transmitting pipe is flush with the outer surface of the panel, a device which is larger than that of the foregoing plate can be installed.

Finally, wherein the envelope has a plurality of heat pipes.

According to the invention, it is possible to reduce or nullify an amount of the adhesive applied in a space between the envelopes.

BRIEF DESCRIPTION OF THE DRAWINGS

The invention will be described in greater detail with reference to the accompanying drawings, wherein.

DESCRIPTION OF THE PREFERRED EMBODIMENTS

Figure 1A:
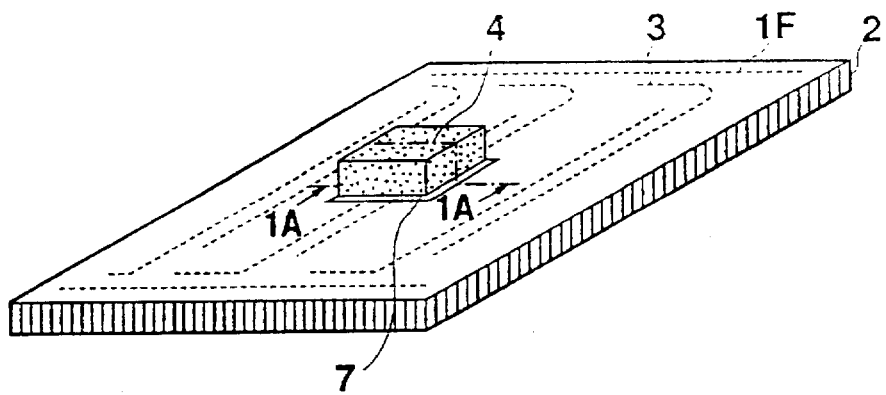
FIG. 1A is a perspective view of a honeycomb sandwich panel with built in heat pipes according to a first embodiment of the invention, showing the panel with a device such as an IC or LSI installed thereon.
Figure 1B:
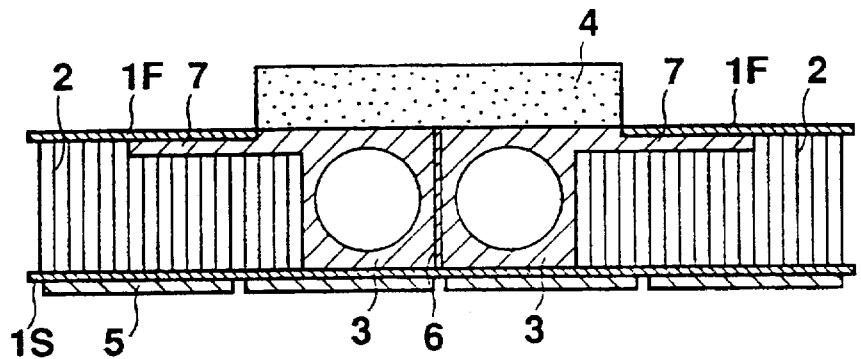
FIG. 1B is a cross section of the honeycomb sandwich panel, taken along line 1A–1A shown in FIG. 1A.

Embodiment 1:

Referring to FIGS. 1A and 1B, a sandwiched honeycomb panel with built in heat pipes comprises inner and outer surfaces 1F and 1S, a honeycomb core 2, and a pair of envelopes 3 having heat pipes therein (called "heat pipes 3" hereinafter), and a second surface mirror 5. In these figures, reference numeral 4 denotes a device such as an IC or LSI to be installed on the inner surface 1F of the honeycomb sandwich panel, and which emits heat during its operation. The honeycomb core 2 reinforces the panel. The heat pipes 3 transmits a large quantity of heat. In this embodiment, the two envelopes are bonded by an adhesive 6. The second surface mirror 5 radiates heat from the device 4 into outer space, and is attached on the other outer surface 1S of the panel.

In this embodiment, at least one radiating fin 7 extends from each envelope, and is made from the same material as that of the envelop. The radiating fin 7 is exposed on a side on which the device 4 is to be installed. As shown in FIG. 1B, a recess is partially made on the exposed area of the radiating fin 7, and is covered by the inner surface 1F of the panel. The radiating fin 7 is mechanically stronger than the inner surface 1F, thereby increasing the ridigity (i.e. mechanical strength) of the panel.

Heat is radiated into outer space via the honeycomb sandwich panel as described below. Heat emitted from the device 3 is directly transmitted to the heat pipes 4 via the non-covered area of the radiating fin 7. In other words, heat is transmitted through the heat pipe network in the panel, and is radiated into outer space via the second surface mirror 5.

The device 4 is directly installed on the radiating fin 7 and the heat pipes 3. Therefore, a thermal resistance in a heat conduction path between the device 4 and the heat pipes 3 can be extensively reduced. Even when the device 4 emits a large amount of heat, it can be maintained at an allowable temperature.

Figure 1C:
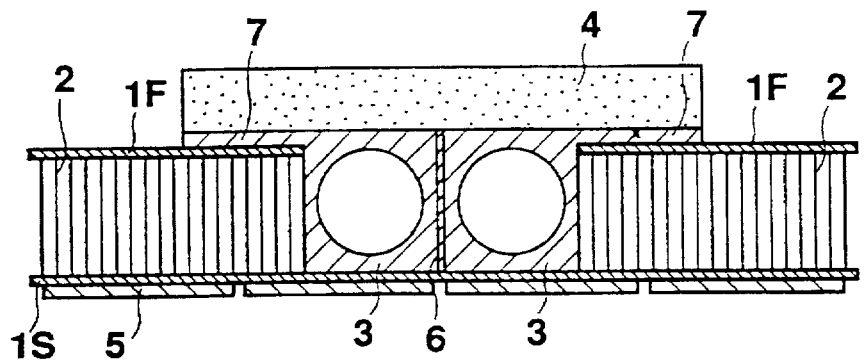
FIG. 1C is a cross section of a modified example of the honeycomb sandwich panel of FIG. 1A.

FIG. 1C shows a modification of the foregoing honeycomb sandwich panel. In this example, the radiating fin 7 partly extends over the inner surface 1F. The inner surface 1F is processed so as to be joined to the radiating fin 7.

Figure 2:
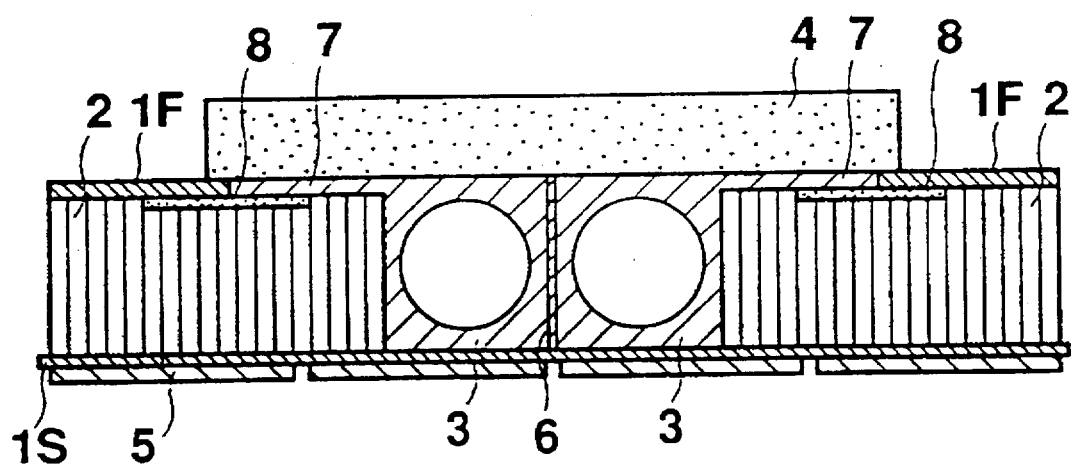
FIG. 2 is a cross section of a honeycomb sandwich panel according to a second embodiment.

Embodiment 2:

In a second embodiment shown in FIG. 2, a radiating fin 7 is joined to an inner surface 1F using a wear plate 8. Both the radiating fin 7 and the inner surface 1F are flush with each other. Thus, it is possible to install a large device 4 compared with the device installed on the radiating fin 7 of the first embodiment.

Figure 3A:
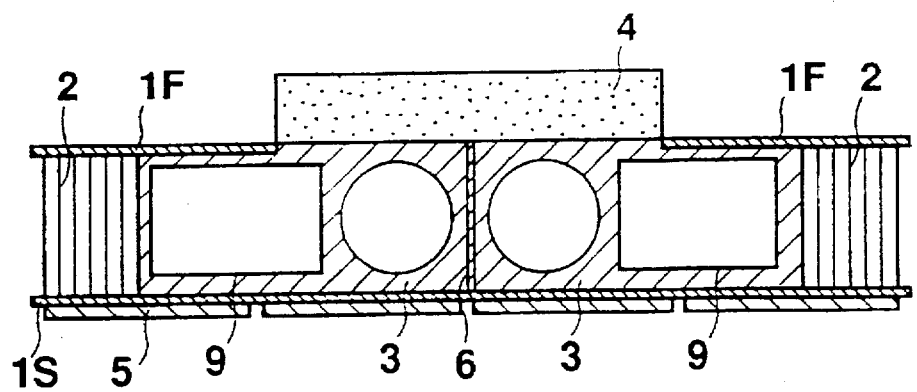
FIG. 3A is a cross section of a honeycomb sandwich panel according to a third embodiment of the invention.

Embodiment 3:

Referring to FIG. 3A, a honeycomb sandwich panel includes heat blocks 9. Each heat block 9 is a hollow portion in the envelope in addition to the heat pipe 3. The hollow heat blocks 9 are effective in making the panel light in weight. The upper part of the envelopes having the heat pipes 3 and the heat blocks 9 therein is partially recessed and covered by the inner surface 1F of the panel. A device 4 is installed on the envelope where it is not covered by the inner surface 1F of the panel.

This honeycomb sandwich panel is mechanically strengthened by the presence of the heat blocks 9, and becomes further rigid. Since the heat blocks 9 are in contact with the device 4 via the envelope, a thermal resistance between the device 4 and the heat pipes 3 and heat blocks 9 can be extensively reduced, which enables the device 4 to be maintained at a reduced temperature. Specifically, the heat blocks 9 can reduce a thermal resistance between the device 4 and the second mirror surface 5 which faces towards outer space.

Figure 3B:
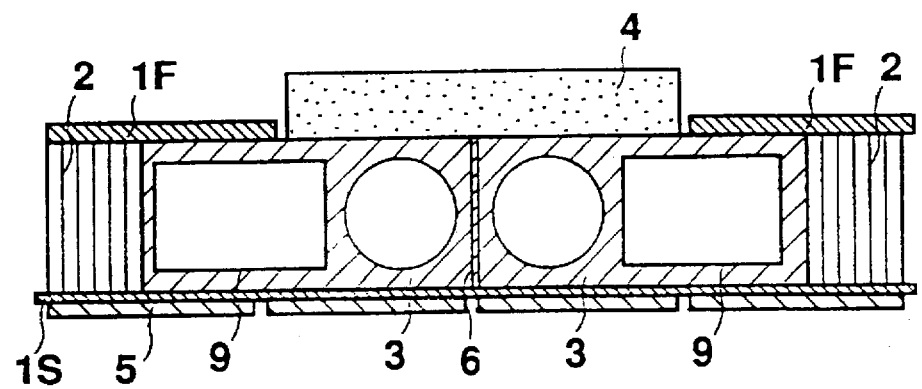
FIG. 3B is a cross section of a modified example of the honeycomb sandwich panel of FIG. 3A.

Heat blocks 9 shown in FIG. 3B do not have a recessed portion which is present in the foregoing example. The heat blocks 9 are partially covered by an inner surface 1F of the panel. For this purpose, the envelopes on the heat blocks 9 are specifically processed so as to be joined with the inner surface 1F of the panel.

Figure 3C:
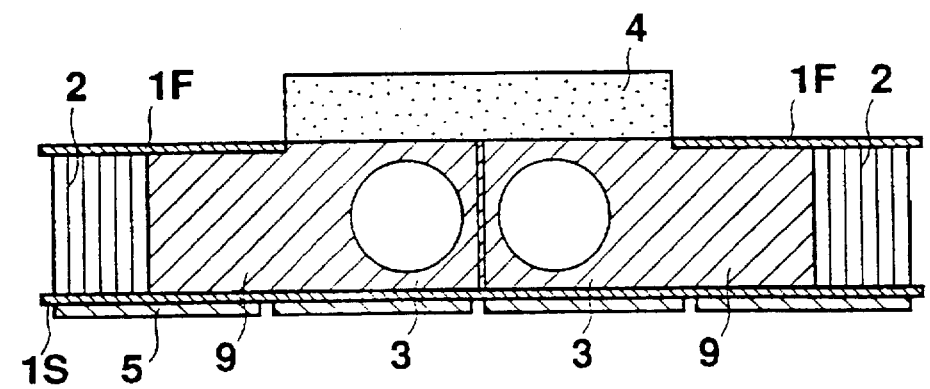
FIG. 3C is a cross section of a further modified example of the honeycomb sandwich panel of FIG. 3A.

Referring to FIG. 3C, a honeycomb sandwich panel has solid heat blocks 9.

Figure 4:
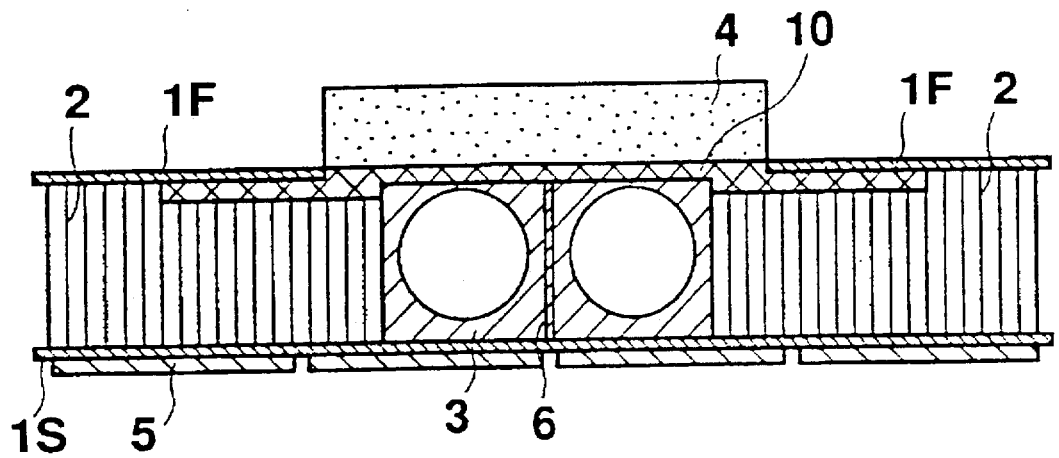
FIG. 4 is a cross section of a honeycomb sandwich panel according to a fourth embodiment of the invention.

Embodiment 4:

A honeycomb sandwich panel of FIG. 4 includes a heat transmitting plate 10 which is present over heat pipes 3 on the side thereof facing a device 4 to be installed. The device 4 is directly installed on the heat transmitting plate 10. The heat transmitting plate 10 is in contact with the heat pipes 3 at a center thereof via the envelopes. The heat transmitting plate 10 is larger than the device 4. The heat transmitting plate 10 is recessed at an area surrounding the device 4, and is covered by the inner surface 1F of the panel.

The heat transmitting plate 10 in direct contact with the heat pipes 3 is substantially as thick as the inner surface 1F of the panel. Since a height of the heat pipes 3 can be adjusted by varying the thickness of the heat transmitting plate 10, it is possible to use existing heat pipes 3 having conventional shapes. Further, since the heat transmitting plate 10 is independent of the heat pipes 3, existing heat pipes of conventional shapes can be utilized. In other words, the heat transmitting plate 10 does not necessitate the use of heat pipes having special members such as the radiating fin 7 or the heat blocks 9, which are used in the foregoing embodiments. This facilitates the production of heat pipes 3.

Even when a load is applied to the honeycomb sandwich panel, the heat transmitting plate 10 can damp out stress generated in the heat pipes 3. Therefore, stress generated in the adhesive 6 joining the envelopes having the heat pipes 3 can be also reduced, which strengthens bonding between the heat pipes 3.

In this example, the heat transmitting plate 10 increases a mechanical strength of the honeycomb sandwich panel.

Further, the device 4 can be in direct contact with the heat transmitting plate 10, which can reduce a thermal resistance between the device 4 and the panel, and extensively reduces heat emitted by the device 4. Especially, the heat transmitting plate 10 is independent of the heat pipes 3. Therefore, conventional heat pipes of any shape can be utilized for the honeycomb sandwich panel. Still further, the heat transmitting plate 10 and the inner surface 1F of the panel are flush with each other on the side where the device 4 is installed, so the device 4 may be larger than the heat transmitting plate 10.

Alternatively, the heat transmitting plate 10 can be attached to the inner surface 1F of the panel without making a recess. In such a case, the inner surface 1F of the panel is processed so as to join the heat transmitting panel 10 thereon.

Figure 5:
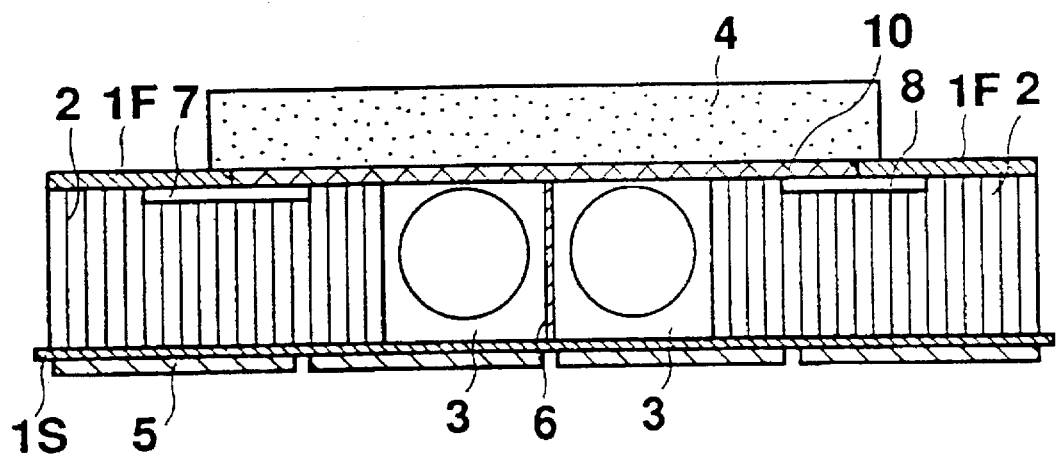
FIG. 5 is a cross section of a honeycomb sandwich panel according to a fifth embodiment of the invention.

Embodiment 5:

In a fifth embodiment shown in FIG. 5, the inner surface 1F of the panel and the heat transmitting plate 10 are joined on the wear plates 8. In this case, the inner surface 1F and the heat transmitting plate 10 are flush with each other. Thus, a device 4 larger than the heat transmitting plate 10 can be installed on the panel.

Figure 6A:
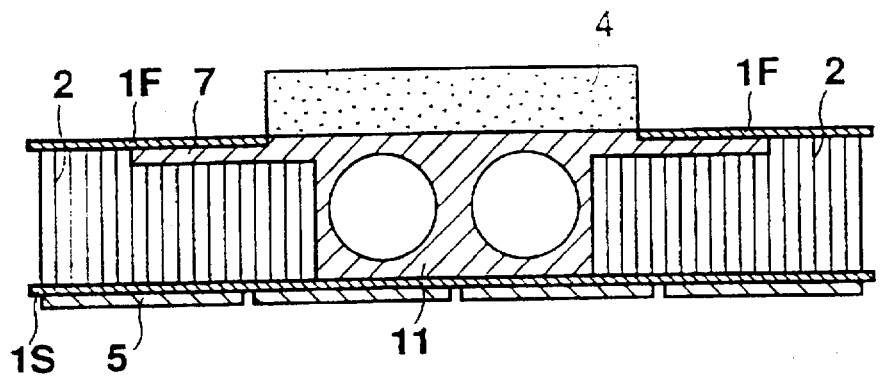
FIG. 6A is a cross section of a honeycomb sandwich panel according to a sixth embodiment of the invention.

Embodiment 6:

FIG. 6A shows a honeycomb sandwich panel according to a sixth embodiment of the invention. The panel includes two heat pipes 11 which are formed in an envelope. This is called "a dual channel structure". Similarly to the first embodiment, a radiating fin 7 is integral with the envelope. The radiating fin 7 is partially recessed so as to be covered by the inner surface 1F of the panel. Since the two heat pipes 11 are formed in one envelope, no adhesive 6 will be necessary. The absence of stress generated in the adhesive 6 can make the panel more rigid, so a large load may be applied to the panel. Further, it is also possible to form three or more heat pipes in one envelope.

Figure 6B:
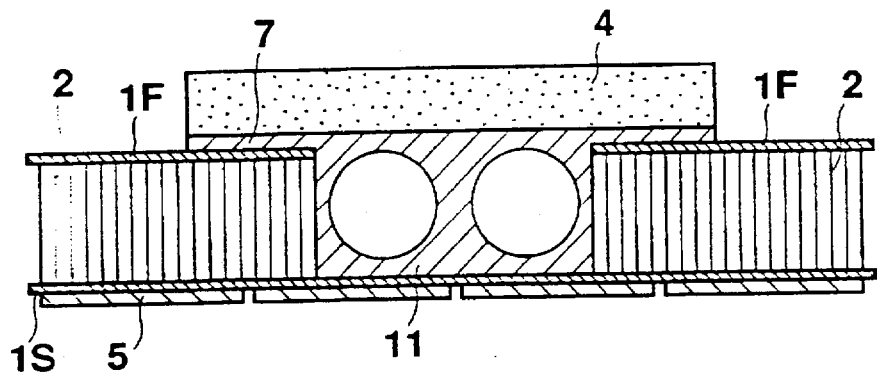
FIG. 6B is a cross section of a modified example of the honeycomb sandwich panel of FIG. 6A.

Referring to FIG. 6B, the radiating fin 7 is overlaid on the inner surface 1F of the panel. In this case, the inner surface 1F is processed so as to be joined with the radiating fin 7.

Figure 6C:
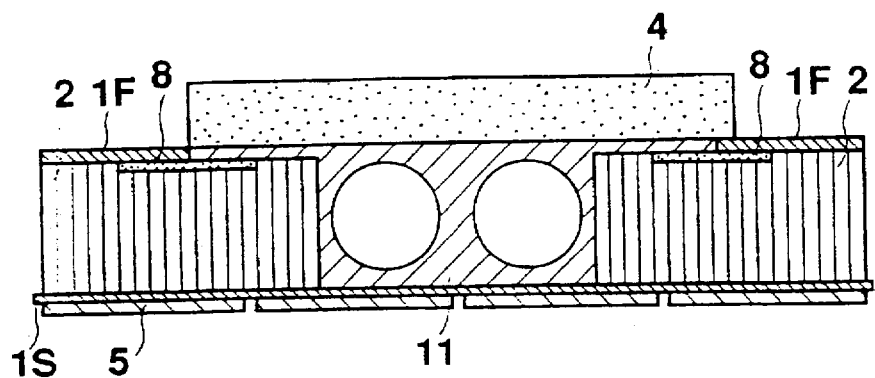
FIG. 6C is a cross section of a further modified example of the honeycomb sandwich panel of FIG. 6A.
Figure 7A:
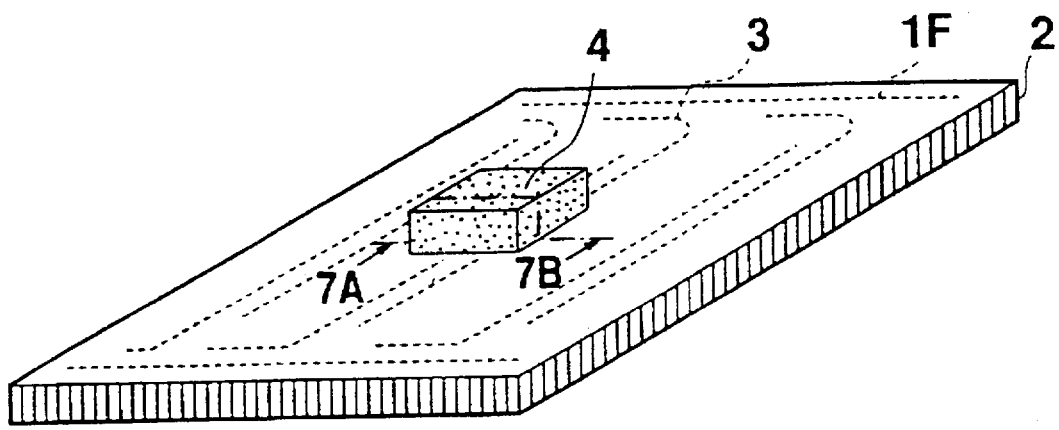
FIG. 7A is a perspective view of an example of conventional honeycomb sandwich panels with a device such as an IC or LSI installed thereon.
Figure 7B:
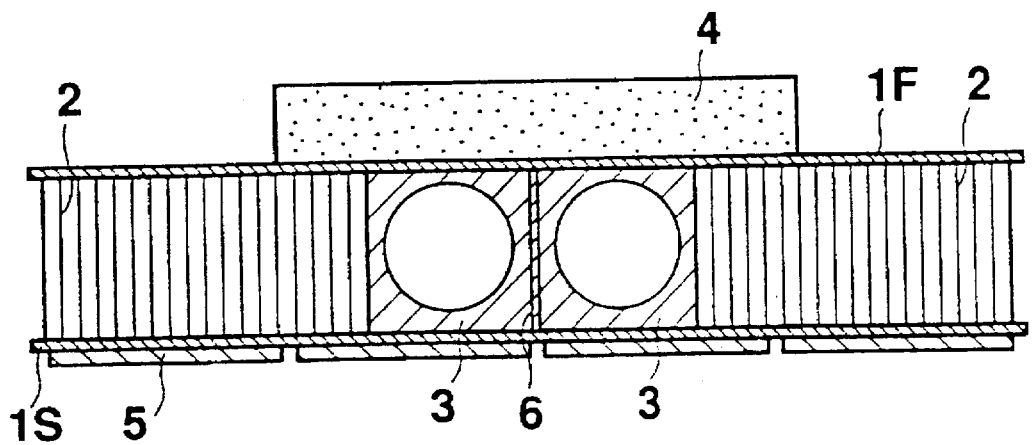
FIG. 7B is a cross section of the honeycomb sandwich panel, taken along line 7A–7A in FIG. 7A.

In a honeycomb sandwich panel of FIG. 6C, the inner surface 1F of the panel and the radiating fin 7 are joined on wear plates 8.

In this embodiment, heat blocks 9 formed in the envelope may be used in place of the radiating fin 7.

What is claimed is:

1. A honeycomb sandwich panel comprising:
a) a honeycomb core sandwiched between outer surfaces;
b) a heat pipe formed in an envelope embedded in the honeycomb core; and
c) a heat transmitting plate which is directly bonded, on its lower surface, to the envelope having the heat pipe therein and which is partially exposed at its upper surface, and is made from a material assuring good heat conducting performance and wherein the exposed portion of the heat transmitting plate is flush with the one of the outer surfaces.

2. The panel according to claim 1, wherein the heat transmitting plate is capable of receiving, on the upper surface which is exposed, a device which emits heat.

3. A honeycomb sandwich panel comprising:
a) a honeycomb core sandwiched between outer surfaces;
b) a heat pipe formed in an envelope embedded in the honeycomb core; and
c) a heat transmitting plate which is directly bonded, on its lower surface, to the envelope having the heat pipe therein and which is partially exposed at its upper surface, and is made from a material assuring good heat conducting performance,
d) wherein the heat transmitting plate is joined to the outer surface of the panel on a wear plate, and the heat transmitting plate and the outer surface of the panel are flush with each other.

4. The panel according to claim 1, wherein the envelope has a plurality of heat pipes.

5. A honeycomb sandwich panel for dispersing heat from a device, the panel comprising:
a honeycomb core;
an envelope embedded in a first portion of the honeycomb core such that the envelope has two opposite sides which are parallel to opposing surfaces of and not covered by the honeycomb core, wherein the envelope includes a heat transmitting plate on one of the two opposite sides;
outer surfaces covering the opposing surfaces of the honeycomb core and the opposite sides of the envelope and heat transmitting plate except for an exposed portion of the heat transmitting plate, the device being attached to the panel so as to contact the exposed portion of the heat transmitting plate, and wherein the exposed portion of the heat transmitting plate is flush with the outer surface;
at least one heat pipe formed in the envelope and extending into a second portion of the honeycomb core.

* * * * *